(12) United States Patent
Yamakita et al.

(10) Patent No.: US 8,339,548 B2
(45) Date of Patent: Dec. 25, 2012

(54) OPTICAL ELEMENT COVERING MEMBER, BACKLIGHT AND LIQUID CRYSTAL DISPLAY

(75) Inventors: Shigehiro Yamakita, Miyagi (JP); Eiji Ohta, Miyagi (JP); Shogo Shinkai, Miyagi (JP); Taku Ishimori, Miyagi (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 12/100,231

(22) Filed: Apr. 9, 2008

(65) Prior Publication Data

US 2008/0252826 A1    Oct. 16, 2008

(30) Foreign Application Priority Data

Apr. 10, 2007    (JP) .................. P2007-103349

(51) Int. Cl.
 G02F 1/1333    (2006.01)
 G02F 1/1335    (2006.01)
 G09F 13/04    (2006.01)
 G09F 13/08    (2006.01)
 G09F 13/10    (2006.01)

(52) U.S. Cl. ......... 349/122; 349/112; 349/96; 362/97.1; 362/97.4

(58) Field of Classification Search .................. 349/112, 349/122, 96; 362/97.1–97.4
See application file for complete search history.

(56) References Cited

U.S. PATENT DOCUMENTS 5,877,846 A * 3/1999 Tahara et al. .................. 355/67
7,085,061 B2    8/2006 Watanabe

FOREIGN PATENT DOCUMENTS

| JP | 51-153648 | 12/1976 |
|---|---|---|
| JP | 2000-131683 | 5/2000 |
| JP | 2001-272509 | 10/2001 |
| JP | 2002-090717 | 3/2002 |
| JP | 2003-249108 | 9/2003 |
| JP | 2003-295186 | 10/2003 |
| JP | 2005-301147 | 10/2005 |
| JP | 2006-024518 | 1/2006 |
| JP | 2006-294356 | 10/2006 |

OTHER PUBLICATIONS

Sharp Corp., Aug. 26, 2006, Machine Translation of JP Pub 2006-294356 from Patent Abstracts of Japan Website, pp. 1-18.*
Nitto Denko Corp., Jan. 26, 2006, Machine Translation of JP Pub 2006-024518 from Patent Abstracts of Japan Website, pp. 1-33.*
Advanced Display Inc, Light Diffusion Material and Liquid Crystal Display Using the Same, Machine Translation of JP Pub 2001-272509 A from Patent Abstracts of Japan website, pp. 1-10.*
Japanese Office Action dated Apr. 14, 2009 corresponding to JP2007-103349.
Japanese Office Action issued Aug. 16, 2011, corresponding to Japanese Appln. No. 2007-103349.

* cited by examiner

*Primary Examiner* — Brian M. Healy
*Assistant Examiner* — Dennis Y Kim
(74) *Attorney, Agent, or Firm* — K&L Gates LLP

(57) ABSTRACT

An optical element covering member includes one or more optical elements, a support medium for supporting the one or more optical elements, and a covering member for covering the one or more optical elements and the support medium. At least one out of the one or more optical elements is a reflective polarizer, and the covering member has at least a region, through which the light inputted from a light source is emitted to a liquid crystal panel, the region having a phase difference lag of not more than $\frac{1}{50}\pi$ of a measured wavelength, with respect to an optical axis of the reflective polarizer.

23 Claims, 12 Drawing Sheets

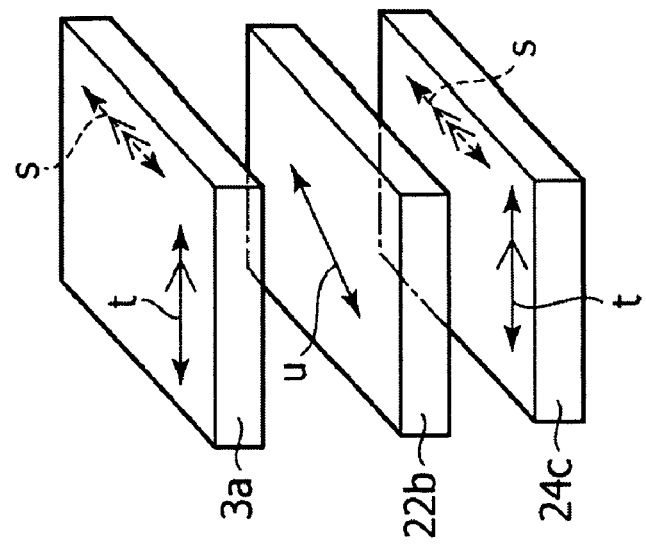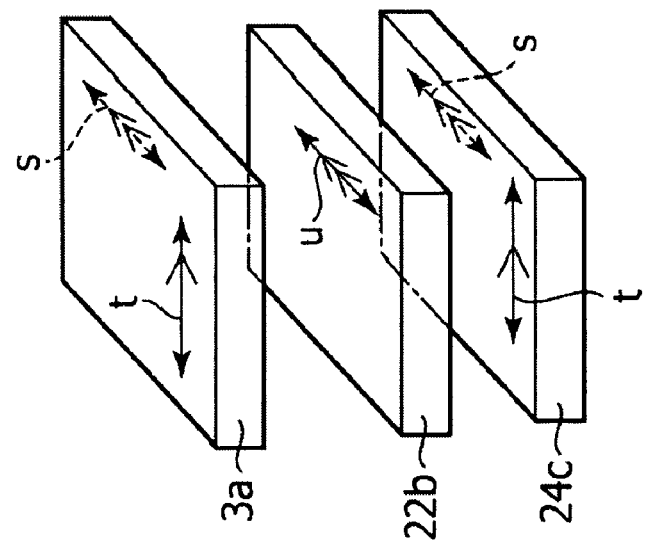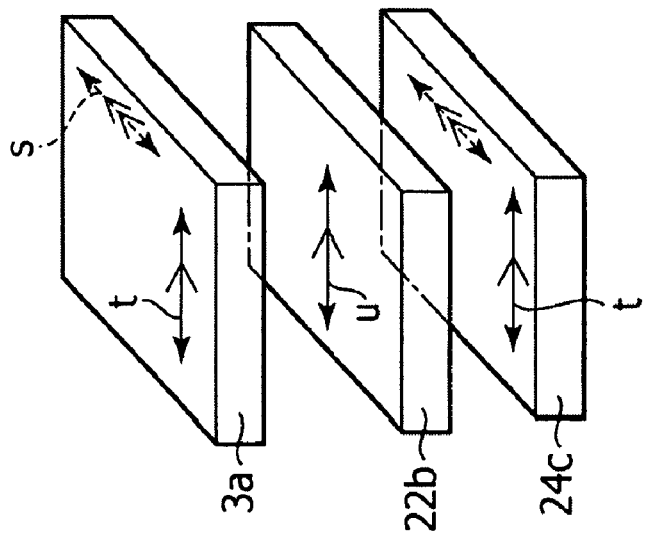

OPTICAL ELEMENT COVERING MEMBER, BACKLIGHT AND LIQUID CRYSTAL DISPLAY

CROSS REFERENCE TO RELATED APPLICATIONS

The present application claims priority to Japanese Patent Application No. 2007-103349 filed in the Japanese Patent Office on Apr. 10, 2007, the entire content of which is being incorporated herein by reference.

BACKGROUND

The present application claims priority to an optical element covering member, as well as a backlight and a liquid crystal display each having the optical element covering member. In particular, the present application relates to an optical element covering member for improving the display characteristics of a liquid crystal display.

In liquid crystal displays, a number of optical elements have been used for improving viewing angle and luminance, and the like. As these optical elements, film-type and sheet-type ones such as diffusion films and prism sheets are used.

FIG. 20 shows a configuration of a known liquid crystal display. As shown in FIG. 20, the liquid crystal display an illuminating device 101 for emitting light, a diffusion plate 102 for diffusing the light emitted from the illuminating device 101, a plurality of optical elements 103 for converging and diffusing the light diffused by the diffusion plate 102, and a liquid crystal panel 104.

Meanwhile, there is a tendency that the weights and the sizes of optical elements increase as the size of image display devices become large in recent years. When the weight and size of the optical elements are increased, rigidity thereof is lowered, thereby causing the deformation of the optical elements. The deformation of the optical elements adversely affects the optical directivity on a display surface, resulting in a serious issue of the irregular luminance.

It has been proposed to improve the low rigidity of the optical elements by increasing the thicknesses of the optical elements. However, the proposal results in increase in the thicknesses of liquid crystal displays and impairs the advantages of the liquid crystal displays, namely, thinness and lightweight. From this reason, it has been proposed to improve the low rigidity of sheet-type or film-type optical elements by bonding optical elements by a transparent adhesive (refer to, for example, Japanese Unexamined Patent Application Publication No. 2005-301147).

However, in the technology disclosed in the publication, the optical elements are bonded together with the transparent adhesive. This will eventually thicken a liquid crystal display, not as thick as one in the method of increasing the thickness of the optical elements. Further, the display characteristics of the liquid crystal display may be deteriorated by the transparent adhesive.

SUMMARY

Therefore, it is desirable to provide an optical element covering member capable of improving low rigidity of optical elements and avoiding deterioration of the display characteristics of a liquid crystal display, while suppressing the increase in thickness of the liquid crystal display, as well as a backlight and a liquid crystal display each having the optical element covering member.

The present inventors have made efforts to improve the low rigidity of optical elements while suppressing the increase in the thickness of a liquid crystal display or the deterioration of the display characteristics the display device. Consequently, application of an optical element covering member which covers an optical element and a support medium by a covering member has been made.

However, according to the inventors' knowledge, the optical element covering member has the following disadvantages. That is, depending upon the phase difference of the covering member, luminance may change and become irregular, or the close tone representation of the signals inputted to the liquid crystal display may be impaired, thereby causing the deterioration of display characteristics. Further, depending upon the optical characteristics of the covering member, a luminance may be extremely lowered.

The present inventors therefore have made efforts for reducing luminance variation in the optical element covering member.

As a result, they have found the limit of the amount of phase difference in a region of the covering member, through which the light from a light source is emitted to a liquid crystal panel. The present application has been made based on the foregoing considerations.

The optical element covering member of a first aspect includes one or more optical elements, a support medium for supporting one or more optical elements, and a covering member for covering the one or more optical elements and the support medium. At least one out of the one or more optical elements is a reflective polarizer. The covering member has at least a region, through which the light inputted from a light source is emitted to a liquid crystal panel, and the region has a phase difference lag of not more than $\frac{1}{50}\pi$ of a measured wavelength, with respect to an optical axis of the reflective polarizer.

The optical element covering member of a second aspect includes one or more optical elements, a support medium for supporting one or more optical elements, and a covering member for covering the one or more optical elements and the support medium. At least one out of the one or more optical elements is a prism sheet. The covering member has at least a region, through which the light inputted from a light source is emitted to a liquid crystal panel, and the region has a phase difference lag of not more than $\frac{1}{14}\pi$ of a measured wavelength, with respect to an optical axis of a polarizing plate provided at the light source side of the liquid crystal panel.

The backlight of a third aspect includes a light source for emitting light, and an optical element covering member for improving the characteristics of the light emitted from the light source and emitting the resultant light to a liquid crystal panel. The optical element covering member includes one or more optical elements, a support medium for supporting the one or more optical elements, and a covering member for covering the one or more optical elements and the support medium. At least one out of the one or more optical elements is a reflective polarizer. The covering member has at least a region, through which the light inputted from the light source is emitted to the liquid crystal panel, and the region has a phase difference lag of not more than $\frac{1}{50}\pi$ of a measured wavelength, with respect to an optical axis of the reflective polarizer.

The backlight of a fourth aspect includes a light source for emitting light, and an optical element covering member for improving characteristics of the light emitted from the light source and emitting the resultant light to a liquid crystal panel. The optical element covering member has the one or more optical elements, a support medium for supporting the one or more optical elements, and a covering member for covering the one or more optical elements and the support medium. At least one out of the one or more optical elements is a prism sheet. The covering member has at least a region, through which the light inputted from the light source is emitted to the liquid crystal panel. The region has a phase difference lag of not more than $\frac{1}{14}\pi$ of a measured wavelength, with respect to an optical axis of a polarizing plate provided on the light source side of the liquid crystal panel.

The liquid crystal display of a fifth aspect includes a light source for emitting light, an optical element covering member for improving characteristics of the light emitted from the light source, and a liquid crystal panel for displaying an image based on the light whose characteristics are improved by the optical element covering member. The optical element covering member has the one or more optical elements, a support medium for supporting the one or more optical elements, and a covering member for covering one or more optical elements and the support medium. At least one out of the one or more optical elements is a reflective polarizer. The covering member has at least a region, through which the light inputted from the light source is emitted to the liquid crystal panel. The region has a phase difference lag of not more than $\frac{1}{50}\pi$ of a measured wavelength, with respect to an optical axis of the reflective polarizer.

The liquid crystal display of a sixth aspect includes a light source for emitting light, an optical element covering member for improving characteristics of the light emitted from the light source, and a liquid crystal panel for displaying an image based on the light whose characteristics are improved by the optical element covering member. The optical element covering member has one or more optical elements, a support medium for supporting the one or more optical elements, and a covering member for covering the one or more optical elements and the support medium. At least one out of the one or more optical elements is a prism sheet. The covering member has at least a region, through which the light inputted from the light source is emitted to the liquid crystal panel. The region has a phase difference lag of not more than $\frac{1}{14}\pi$ of a measured wavelength, with respect to an optical axis of a polarizing plate provided at the light source side of the liquid crystal panel.

In an embodiment, one or more optical elements and a support medium are covered by the covering member, thereby enabling integration of the optical elements and the medium. Hence, the low rigidity of the optical elements may be compensated by the support medium.

Additionally, the luminance variation can be suppressed by defining the phase difference lag of the region of the covering member, through which the light from the light source is emitted to the liquid crystal panel, with respect to the optical axis of the polarizing plate provided at the covering member side of the liquid crystal panel.

Additional features and advantages are described herein, and will be apparent from the following Detailed Description and the figures.

BRIEF DESCRIPTION OF THE FIGURES

FIGS. 9A to 9C are schematic views showing the relation of the apparent phase difference of the covering member in the first embodiment;

DETAILED DESCRIPTION

Figure 1:
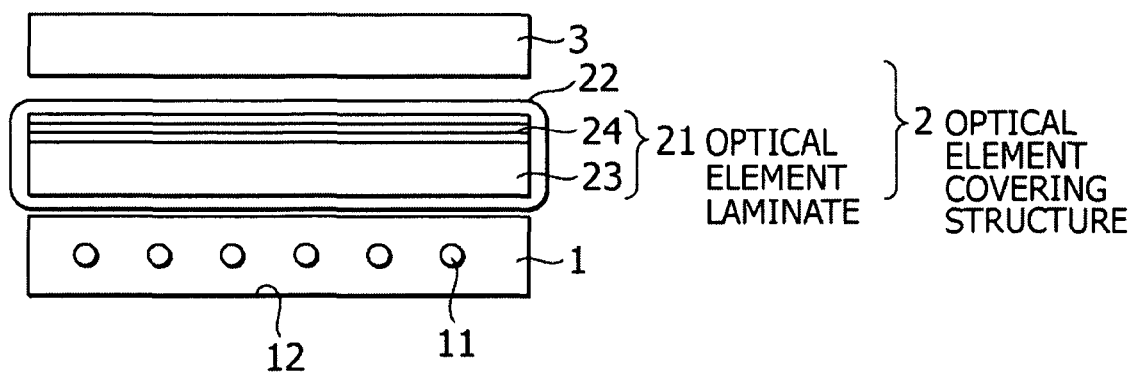
FIG. 1 is a schematic view showing an example of the configuration of a liquid crystal display according to a first embodiment.

An embodiment will now be described in detail with reference to the accompanying drawings. Same reference numerals are used in all of the drawings to denote same or corresponding parts in the embodiments.

1. First Embodiment 1-1. Configuration of Liquid Crystal Display

FIG. 1 shows an example of the configuration of a liquid crystal display according to a first embodiment. As shown in FIG. 1, the liquid crystal display includes a illuminating device 1 for emitting light, an optical element covering member 2 for improving characteristics of the light emitted from the illuminating device 1, and a liquid crystal panel 3 for displaying an image based on the light whose characteristics are improved by the optical element covering member 2. A backlight includes the illuminating device 1 and the optical element covering member 2. Hereinafter, a plane through which the light from the illuminating device 1 is entered is referred to as an "incident surface", a plane through which the light entered through the incident surface is emitted is referred to as an "transmission surface", and a plane provided between the incident surface and the transmission surface is referred to as an "end face." The incident surface and the transmission surface are inclusively called a "main surface" as appropriate.

The illuminating device 1 is, for example, a directly below type, and includes a light source 11 for emitting light, and a reflector 12 for reflecting the light emitted from the light source 11 so as to be directed to the liquid crystal panel 3. As the light source 11, a cold cathode fluorescent lamp (CCFL), a hot cathode fluorescence lamp (HCFL), an organic electroluminescence (OEL) and a light emitting diode (LED) may be used. The reflector 12 is disposed such that it covers the lower areas and side areas of one or more light sources 11, and reflects the lights emitted to lower area and side are of the one or more light sources 11 such that the light is directed to the liquid crystal panel 3.

For example, the optical element covering member 2 includes one or more optical elements 24, in which the optical characteristics of the light emitted from the illuminating device 1 are changed by processing such as diffusion and convergence of light, a support medium 23 for supporting the one or more optical elements, and a covering member 22 for covering and integrating the optical elements 24 and the support medium 23. Hereinafter, one in which the support medium 23 and the one or more optical elements 24 are stacked is referred to as an optical element lamination 21.

No limit is imposed on the number and the type of the optical elements 24, and any suitable number and any type may be selected according to the characteristics of a desired liquid crystal display. For example, the optical elements 24 may be those consisting of the support medium 23 and one or more functional layers, or those consisting only of one or more functional layers. Alternatively, a light diffusion element, a light converging element, a reflective polarizer, a polarizer or a light division element may be used as the optical elements 24. The optical elements 24 may be a film type, a sheet type or a plate type. A thickness of the optical elements 24 is, for example, 5 µm to 1000 µm.

The support medium 23 is a transparent plate that allows the passage of the light emitted from the illuminating device 1, or an optical plate in which the optical characteristics of the light emitted from the illuminating device 1 are changed by diffusion and convergence of light. As the optical plate, a diffusion plate, a phase difference plate or a prism plate may be used. For example, the support medium 23 has a thickness of 1000 µm to 50000 µm. Preferably, the support medium 23 is composed of a high polymer material and has a transmittance of 30% or above. The lamination order of the optical element 24 and the support medium 23 is determined in accordance with the functions of the optical element 24 and the support medium 23. For example, if the support medium 23 is a diffusion plate, the support medium 23 is disposed on the side at which the light from the illuminating device 1 is entered, and if the support medium 23 is a reflective polarizer, the support medium 23 is disposed on the side at which the light is emitted to the liquid crystal panel 3. The shapes of the incident surface and the transmission surface of the optical elements 24 and the support medium 23 are selected according to the shape of the liquid crystal panel 3. For example, a rectangular shape having different aspect ratios.

Preferably, concave-convex processing is performed to the main surface of the optical element 24 and the main surface of the support medium 23, or alternatively fine particles may be contained in these main surfaces to reduce rubbing and friction. Alternatively, additives such as light stabilizing agent, UV absorber, antistatic agent, flame retardant and antioxidant may be contained in the optical element 24 and the support medium 23 where necessary, in order to impart UV absorbing function, infrared absorbing function and electrostatic suppressing function to the optical element 24 and the support medium 23. Alternatively, surface treatments such as anti-reflection (AR) treatment and anti-glare (AG) treatment may be applied to surfaces of the optical element 24 and the support medium 23, in order to reduce the diffusion of the reflected light and the reflected light itself. Alternatively, the function for reflecting ultraviolet ray and infrared may be imparted to the surfaces of the optical element 24 and the support medium 23.

The covering member 22 is in the shape of a film of a transparent single layer or a plurality of transparent layers, a sheet or a bladder. For example, the covering member 22 is in the shape of a sheet, and the end faces in the longitudinal direction thereof are preferably bonded together on the end face of the optical element stack 21. Alternatively, the covering member 22 has a open-ended tubular shaped shape with no bonding portion. Hereinafter, the surface of the covering member 22 at the side of the optical element stack 21 is referred to as the inner surface, and the opposite surface is referred to the outer surface. In the covering member 22, a region at an input surface side through which the light entered from the illuminating device 1 is referred to as a first region, and the region at an output surface side through which the light inputted from the illuminating device 1 is emitted to the liquid crystal panel 3 is referred to as a second region.

For example, when the main surface of the optical element stack 21 has a rectangular shape having a different aspect ratio, the main surface and both end faces connected to the long sides of the main surface are covered by the covering member 22, and both end faces connected to the shorter sides are exposed from the covering member 22. Alternatively, the main surface and both end faces connected to the short sides of the main surface are covered by the covering member 22, and the main surface and both end faces connected to the long sides of the main surface are exposed.

The thickness of the covering member 22 is in the range of 5 to 5000 µm, preferably 10 to 500 µm, and more preferably 30 to 300 µm. Alternatively, the thickness of the covering member 22 may be different at the incident surface side and the transmission surface side. In this case, the incident surface side is preferably thicker compared to the transmission surface side. This is because, by thickening the incident surface side, it is possible to suppress the shapes of the support medium 23 and the optical element 24 from being changed due to the heat generated from the light source 11. Preferably, 50% or more area of the main surface of the optical element stack 21 is covered by the covering member 22. Alternatively, the covering member 22 may include a structure (a surface structured member) as an aggregate.

When the reflective polarizer is disposed immediately below the second region of the covering member 22, namely at the position adjacent to the second region, the phase difference lag of the covering member 22 with respect to the optical axis of the reflective polarizer is not more than $\frac{1}{50}\pi$ of a measured wavelength. This reduces the unevenness of luminance. The phase difference lag means a phase difference lag with respect to the transmission axis of the polarizing plate provided at the light source 11 side of the reflective polarizer and the liquid crystal panel 3. The reason of setting the numerical values will be described later. Alternatively, the first region and the second region of the covering member 22 may have different phase differences. In this case, at least the second region (the transmission surface) of the covering member 22 may satisfy the relation that the phase difference lag with respect to the optical axis of the reflective polarizer is not more than $\frac{1}{50}\pi$.

The material of the covering member 22 is preferably a high polymeric material having thermal shrinkage property, more preferably a high polymeric material that is shrinked by applying heat in the range from a room temperature to 85° C. No limit is imposed on the material of the covering member 22, as long as it satisfies the relation in terms of the phase difference lag with respect to the optical axis of the reflective polarizer. Specifically, polystyrene (PS), copolymer of polystyrene and butadiene, polypropylene (PP), polyethylene (PE), unextended polyethylene terephthalate (PET) and polycarbonate (PC) are suitable because these have a tendency of having a small maximum phase difference. For example, polyester based resin such as polyethylene naphthalate (PEN), vinyl based resin such as polyvinyl alcohol (PVA), cyclo-olefin based resin, urethane based resin, vinyl chloride based resin and natural rubber based resin, as well as artificial rubber based resin can be used singularly or in combination, when their respective optical axes are substantially parallel to the optical axis of the polarizing plate provided at the light source 11 side of the reflective polarizer and the liquid crystal panel 3 used as the optical element 24. This is because the apparent phase difference can be reduced to zero by arranging the optical axis of the covering member 22 parallel to the optical axis of the polarizing plate provided at the light source 11 side of the reflective polarizer and the liquid crystal panel 3.

In consideration of the size and the material of the support medium 23 and the optical element 24 to be covered, and the use environment of the optical element stack 21, the thermal shrinkage of the covering member 22 at 90° C. is 0.2% to 100%, preferably 0.5% to 20%, and more preferably 1% to 10%. Below 0.2%, the adhesion between the covering member and the optical element might be lowered. When the shrinkage rate exceeds 100%, the thermal shrinkage might be non-uniform within a plane, thereby causing the optical element to be shrunk. The thermal deformation temperature of the covering member 22 is preferably 90° C. or above, in order to prevent the optical characteristics of the optical element covering member 2 from being deteriorated due to the heat generated from the light source 11. The drying loss of the material of the covering member 22 is preferably not more than 2%. The coefficient of thermal expansion of the covering member 22 is preferably smaller than that of the support medium 23 and that of the optical element 24 to be covered by the covering member 22, in order to enhance the adhesion between the covering member 22 and the optical element stack 21. The refractive index of the material of the covering member 22 (the refractive index of the covering member 22) is preferably not more than 1.6, more preferably not more than 1.55.

Preferably, the covering member 22 contains one or more types of filler. At least one type of organic fillers and inorganic fillers can be used. As the material of the organic filler, acrylic resin, styrene resin, fluorine, cavities and the like can be used singularly or in combination. As the inorganic filler, silica, alumina, talc, titanium oxide, barium sulfate and the like may be used singularly or in combination. The filler may have various shapes such as needle, sphericity, ellipsoid, plate and scale. The filler may have one or more kinds of diameters.

Alternatively, additives such as light stabilizing agent, UV absorber, antistatic agent, flame retardant and antioxidant may be further contained in the covering member 22 where necessary, in order to impart UV absorbing function, infrared absorbing function and electrostatic suppressing function to the covering member 22. Alternatively, surface treatments such as anti-reflection (AR) treatment and anti-glare (AG) treatment may be applied to a surface of the covering member 22, in order to reduce the diffusion of the reflected light and the reflected light itself. Furthermore, the function for transmitting the light of a specific wavelength region such as UV-A light (approximately 315 to 400 nm) may be imparted to the covering member 22.

The liquid crystal panel 3 is for displaying information by controlling the light supplied from the light source 11. Examples of the operation modes of the liquid crystal panel 3 include twisted nematic (TN) mode, vertically aligned (VA) mode, in-plane switching (IPS) mode, and optically compensated birefringence (OCB) mode.

1-2. Next, the configuration examples of the optical element covering member 2 will be described in detail with reference to FIGS. 2 to 4.

Figure 2:
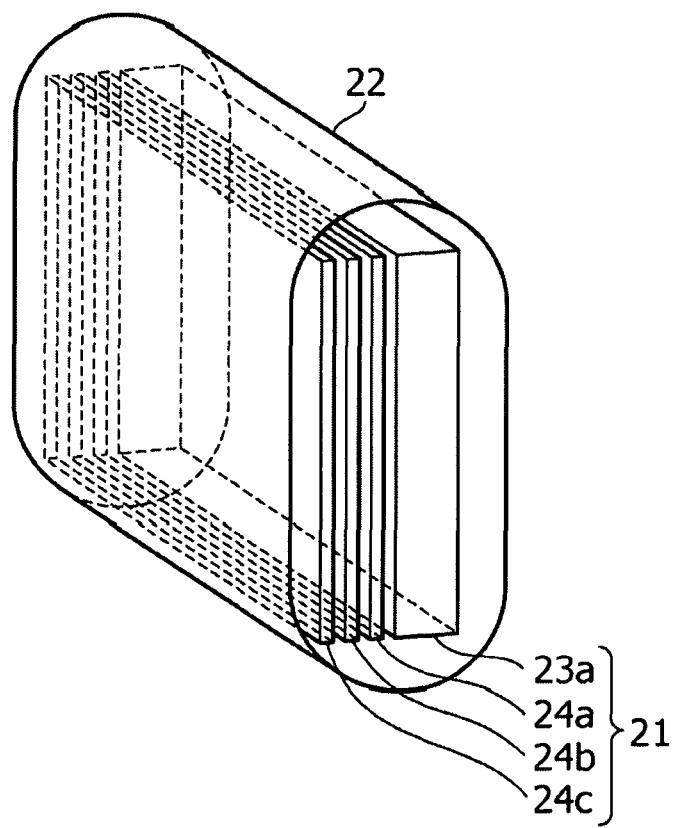
FIG. 2 is a perspective view showing a first configuration example of an optical element covering member in the first embodiment.

FIG. 2 shows a first configuration example of the optical element covering member according to the first embodiment of the application. As shown in FIG. 2, the optical element covering member 2 has, for example, a diffusion plate 23a as a support medium, and a diffusion film 24a, a lens film 24b and a reflective polarizer 24c, each being an optical element, as well as a covering member 22 for covering and integrating the elements. In this case, the diffusion plate 23a, the diffusion film 24a, the lens film 24b, and the reflective polarizer 24c form the optical element stack 21. For example, the main surface of the optical element stack 21 has a rectangular shape of a different aspect ratio. The main surface of the optical element stack 21 and both end faces connected to the long sides of the main surface are covered by the sheet-shaped covering member 22, and the both end faces connected to the short sides of the optical element stack 21 are exposed. Both ends in the longitudinal direction of the sheet-shaped covering member 22 are bonded together, for example, at the end faces on the longer sides of the optical element stack 21.

The diffusion plate 23a is disposed above one or more light source 11, and equalizes luminance by diffusing the light emitted from the one or more light source 11 and the light reflected by the reflector 12. For example, the diffusion plate 23a may have in the surface thereof a concave-convex structure for diffusing the light. The diffusion plate 23a may mainly contain fine particles having a different refractive index, or may contain porous fine particles. Alternatively, the concave-convex structure, the fine particles and the porous fine particles may be used in combination. As the fine particles, at least one type of organic fillers and inorganic fillers may be used. For example, the concave-convex structure, the fine particles and the porous fine particles are present in the transmission surface of the diffusion film 24a. The diffusion plate 23a has a light transmittance of 30% or above, for example.

The diffuser film 24a is disposed on the diffusion plate 23a, and diffuses the light diffused by the diffusion plate 23a. For example, the diffuser film 24a may have in the surface thereof a concave-convex structure for diffusing the light. The diffuser film 24a may use fine particles having a different refractive index as the main component, or the component containing porous fine particles. Alternatively, the concave-convex structure, the fine particles and the porous fine particles may be used in combination. As the fine particles, at least one type of organic fillers and inorganic fillers may be used. For example, the concave-convex structure, the fine particles and the porous fine particles are present in the transmission surface of the diffuser film 24a.

The lens film 24b is disposed above the diffuser film 24a, for the purpose of improving the directivity of the irradiated light, and the like. For example, a fine prism lens array is provided on the transmission surface of the lens film 24b. Preferably, the cross section in the direction of the prism lens array has, for example, substantially a triangle shape, and the vertex thereof is rounded. This provides an improvement in cutoff and wide viewing angle.

For example, the diffuser film 24a and the lens film 24b are composed of a high polymeric material, having a refractive index of 1.5 to 1.6. The optical element 24 or an optical functional layer provided thereto is preferably composed of a photosensitive resin cured by light or electron beam, thermosetting resin cured by heat, or most preferably UV curing resin cured by UV.

The reflective polarizer 24c, which is disposed on a lens film, permits passage of only one of orthogonal polarization compositions and reflects the other out of the lights whose directivity is enhanced by a lens sheet. For example, the reflective polarizer 24c is a stack of, for example, organic multilayer films, inorganic multilayer films or liquid crystal multilayer films. Alternatively, a material having a different refractive index may be contained in the reflective polarizer 24c, or a diffuser lens may be mounted on the reflective polarizer 24c.

Figure 3:
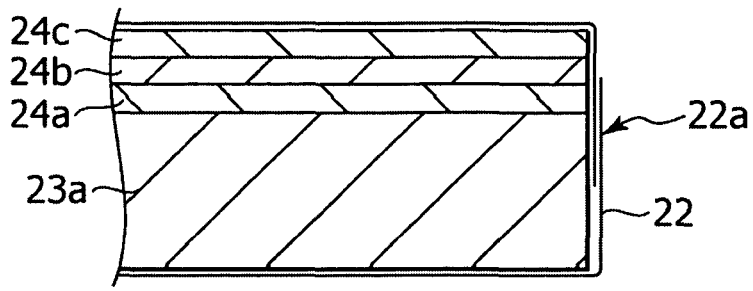
FIG. 3 is a sectional view showing a first example of a bonded portion of a covering member in the first embodiment.

Examples of the bonding portions of the covering member 22 will now be described with reference to FIGS. 3 and 4. FIG. 3 shows a first example of the bonding portions of the covering member. In the first example, the inner surface of end portion and the outer surface of the other end of the covering member 22 are bonded together in a manner they are overlapped above the end face of the optical element stack 21, as shown in FIG. 3. That is, the ends of the covering member 22 are bonded together along the end face of the optical element stack 21.

Figure 4:
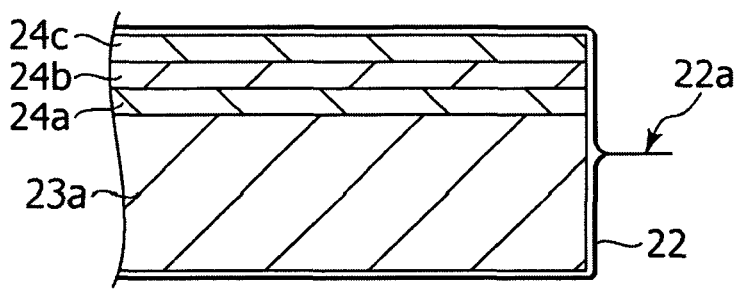
FIG. 4 is a sectional view showing a second example of a bonded portion of the covering member in the first embodiment.

FIG. 4 shows a second example of the bonding portions of the covering member 22. In the second example, the inner surface of one end and the inner surface of the other end of the covering member 22 are bonded together such that they overlap at above the end face of the optical element stack 21, as shown in FIG. 4. That is, the ends of the covering member 22 are bonded together in a manner they rise from the end face of the optical element stack 21.

Figure 5:
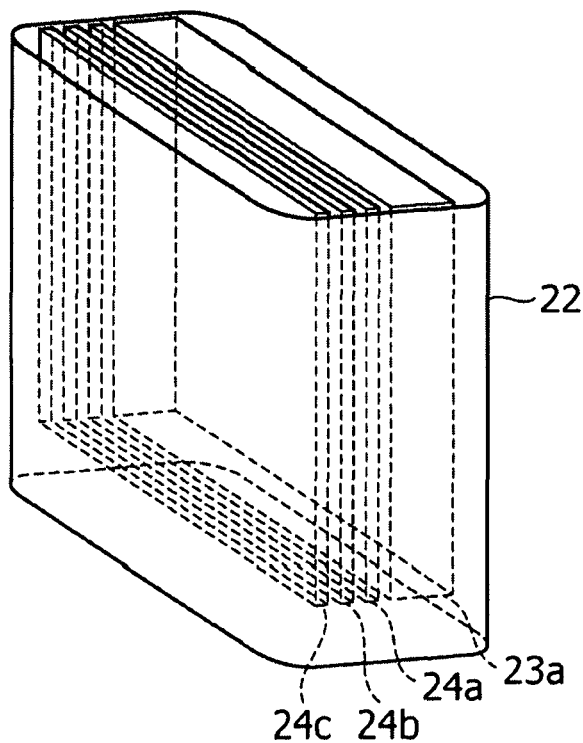
FIG. 5 is a perspective view showing a second configuration example of the optical element covering member in the first embodiment.

FIG. 5 shows a second configuration example of the optical element covering member in the first embodiment. As shown in FIG. 5, the incident surface and the transmission surface of the optical element stack 21 and both end faces connected to the short sides are covered by the sheet-shaped covering member 22, and both side surfaces on the shorter sides of the optical element stack 21 are exposed. The ends in the longitudinal direction of the sheet-shaped covering member 22 are bonded together on the end face on the longer side of the optical element stack 21.

Figure 6:
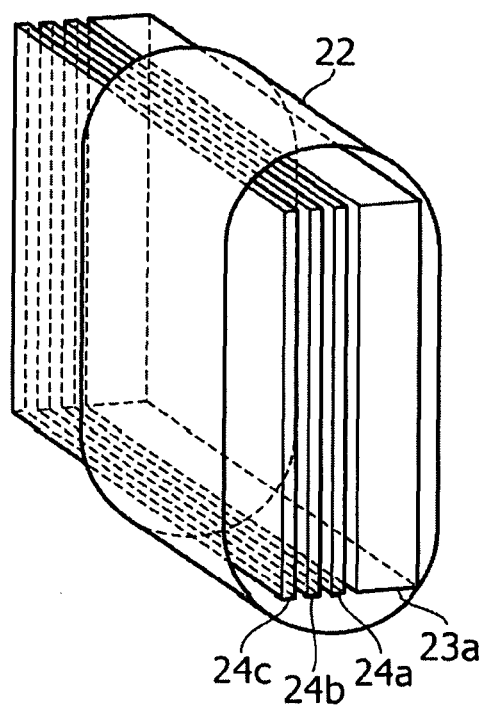
FIG. 6 is a perspective view showing a third configuration example of the optical element covering member in the first embodiment.

FIG. 6 shows a third configuration example of the optical element covering member in the first embodiment. As shown in FIG. 6, the central portion of the optical element stack 21 and its vicinity are covered with the sheet-shaped covering member 22, and both ends on the shorter sides of the optical element stack 21 are exposed. The ends in the longitudinal direction of the sheet-shaped covering member 22 are bonded together at the end face on the longer side of the optical element stack 21.

The following is the reason why the phase difference lag of the covering member 22 with respect to the optical axis of the reflective polarizer is set to be not more than $\frac{1}{50} \pi$ of a measured wavelength.

Figure 7:
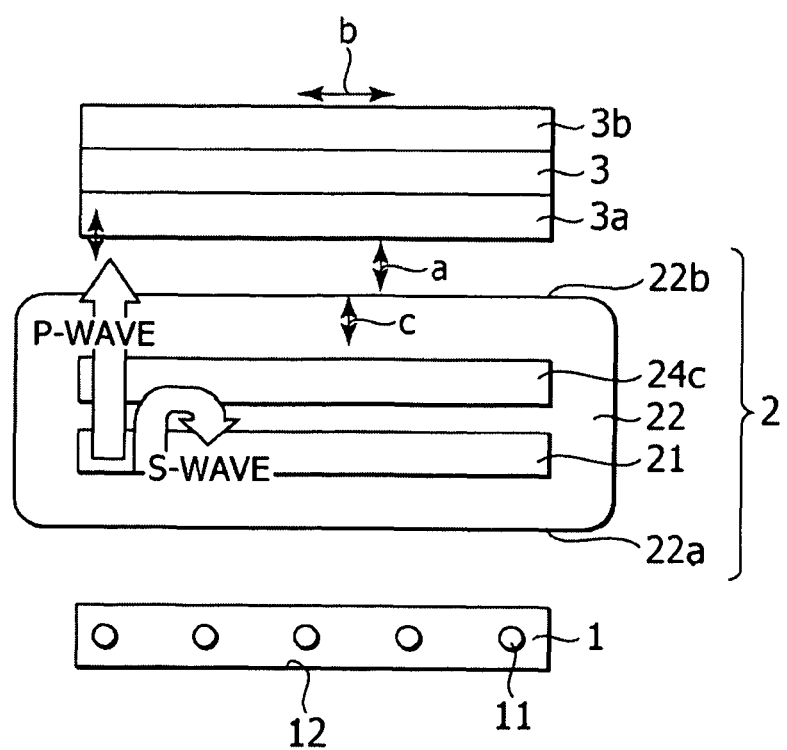
FIG. 7 is a schematic view for illustrating the phase difference of a covering member of the liquid crystal display in the first embodiment.

First, the role of the reflective polarizer 24c disposed immediately below the second region 22b of the covering member 22 will be described with reference to FIG. 7. In FIG. 7, polarizing plate 3a and 3b are disposed on both surfaces of the liquid crystal panel 3, respectively. The polarizing plate 3a and 3b permit passage of only one of the orthogonal polarization compositions of incident lights, and shield the other by absorption. For example, the polarizing plate 3a and 3b are disposed such that respective transmission axes are orthogonal to each other. The arrow "a" denotes the transmission axis of the sheet polarizing plate 3a, the arrow "b" denotes the transmission axis of the polarizing plate 3b, and the arrow "c" denotes the transmission axis of the reflective polarizer 24c. The transmission axis of the polarizing plate 3a, which is disposed closer to the light source 11 of the liquid crystal panel 3 than the arrow a and the arrow c, is parallel to the transmission axis of the reflective polarizer 24c. In FIG. 7, the diffusion plate 23a, the diffuser film 24a and the lens film 24b are collectively represented as the optical element stack 21, and only the reflective polarizer 24c in the optical element stack 21 is shown separately.

The reflective polarizer 24c selectively transmits the light (P-wave) passing through the polarizing plate 3a provided at the light source 11 side, out of a pair of the polarizing plate 3a and 3b adjacent to the liquid crystal panel 3, and reflects the unabsorbed light (S-wave). During the cycle that these lights are reflected from the reflective polarizer 24c and reach the illuminating device 1, and then reflected at the reflector 12 of the illuminating device 1 and reenter the reflective polarizer 24c, these lights pass through the optical element stack 21, resulting in the lights in which the P-wave and the S-wave are mixed together. By repeating the cycle, the lights can be efficiently transmitted to the polarizing plate 3a at the light source 11 side. Thus, the light emitted from the reflective polarizer 24c is emitted as a polarized light parallel to the transmission axis of the polarizing plate 3a at the light source 11 side.

When the covering member 22 covers the optical element stack 21 and the reflective polarizer 24c as shown in FIG. 7, if the second region 22b of the covering member 22 has a phase difference, the polarized light of the light emitted from the reflective polarizer 24c may be collapsed by the light passing in and out of the second region 22b. As a result, the light may be absorbed by the polarizing plate 3a, causing a degradation of luminance.

For example, when the phase difference of the covering member 22 is a half of a wavelength, a so-called ½ λ plate, the P-waves emitted from the reflective polarizer 24c are all emitted after being converted to S-waves during passage through the second region 22b of the covering member 22. Since the S-waves are perpendicular to the transmission axis of the polarizing plate 3a, no light is transmitted at this time, and the luminance is reduced to almost zero.

For example, when the phase difference of the covering member 22 is a ¼ λ plate of a wavelength, the P-waves emitted from the reflective polarizer 24c are emitted after a half of them are converted to S-waves during passage through the second region 22b of the covering member 22. Since the S-waves are perpendicular to the transmission axis of the polarizing plate 3a, no S-wave is transmitted, and only the P-waves are transmitted at this time, whereby the luminance is reduced to approximately a half.

The phase difference of the covering member 22 and the amount of converting P-wave to S-wave are given by the following equation:

$$R = 1 - \sin^2 \theta$$

where

θ=(Phase difference lag)/(Wavelength)×π; and $$R = (P\text{-wave intensity})/(P\text{-wave intensity} + S\text{-wave intensity})$$

Figure 8:
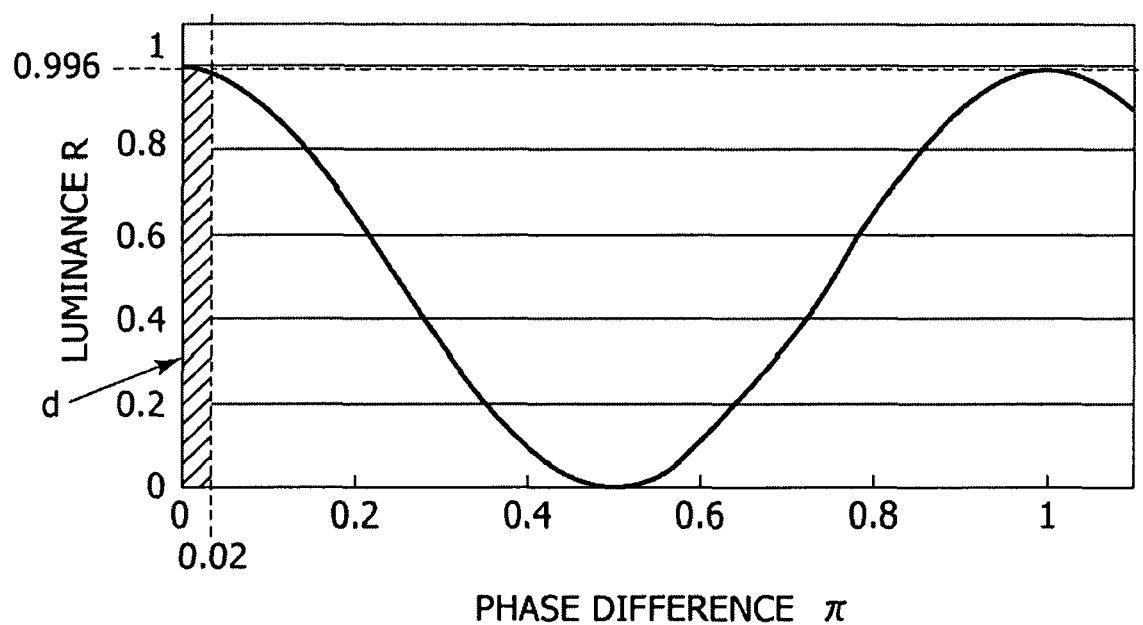
FIG. 8 is a graph showing the relation between the phase difference of the covering member and a luminance ratio R in the first embodiment.

FIG. 8 shows a graph, in which the lateral axis represents the phase difference of the covering member 22 and the vertical axis represents a luminance ratio R where it is 1 when the phase difference of the covering member 22 is zero. In a general liquid crystal display, input signals are expressed in 256 tones. That is, when the in-plane luminance variation is 0.4% or above, the output with respect to the inputted signal is varied more than one tone. If the relation between input and output is not held, a liquid crystal display is difficult to function. It is therefore necessary that the in-plane luminance variation is not more than 0.4% at minimum. As can be seen from FIG. 8, for attaining a luminance variation of not more than 0.4%, it is required to be the slant-line range indicated by the arrow "d" in FIG. 8, corresponding to the range where the luminance ratio R is 1 to 0.996. That is, the phase difference has to be not more than 1/50 π. For example, with respect to the light having a measured wavelength of 550 nm, the phase difference lag has to be not more than 11 nm.

In this case, the phase difference lag indicates the phase difference lag with respect to the transmission axes of the polarizing plate 3a at the reflective polarizer 24c and the light source 11 side.

In general, a phase difference is measured under the condition that a polarizer/an analyzer is disposed at an angle by 45° to the optical axis of the covering member 22, relative to the optical axis of the covering member 22. This results in the maximum value of the phase difference. The apparent phase difference when the optical axis of the covering member 22 and the optical axis of the polarizer/analyzer form an angle α with respect to maximum value of the phase difference measured by an 45° angle will change as follows:

(Apparent phase difference)=|(Maximum value of phase difference)×sin 2α|

When a phase difference is measured by arranging the polarizer/analyzer parallel or perpendicular to the optical axis of the covering member 22, the phase difference is measured as zero.

In an embodiment, the phase difference is obtained based on the optical axis of the polarizing plate 3a at the reflective polarizer 24c side and the light source 11 side instead of based on an optical axis of the covering member 22. FIGS. 9A to 9C are schematic views for explaining the relation of the apparent phase difference when the optical axis of the second region 22b of the covering member 22 is changed with respect to the optical axes of the reflective polarizer 24c and the polarizing plate 3a. In FIGS. 9A to 9C, the arrow "u" indicates the optical axis of the second region 22b of the covering member 22, the arrow "s" indicates the absorption axes of the polarizing plate 3a and the reflective polarizer 24c, and the arrow "t" indicates the transmission axes of the polarizing plate 3a and the reflective polarizer 24c.

In FIGS. 9A and 9B, the optical axis of the second region of the covering member 22 is parallel to the optical axes of the reflective polarizer 24c and the polarizing plate 3a, and hence the apparent phase difference becomes zero. On the other hand, in FIG. 9C, the optical axis of the second region 22b of the covering member 22 forms an angle of 45° with respect to the optical axes of the reflective polarizer 24c and the polarizing plate 3a, and hence the apparent phase difference becomes the maximum. That is, as shown in FIGS. 9A, 9B and 9C, the apparent phase difference becomes zero when the optical axes of the reflective polarizer 24c and the polarizing plate 3a and an optical axis of the second region 22b of the covering member 22 are substantially parallel, even how large phase difference the optical axis of the second region 22b of the covering member 22 might have.

Accordingly, it can be seen that, in the first embodiment, the second region 22b of the covering member 22 is required to satisfy the relation as expressed by the following equation:

$$Re \times \sin 2\alpha \leq (1/50)\pi$$

where Re is the maximum phase difference of the second region 22b of the covering member 22, and α is an angle formed between the optical axis of the second region 22b and the transmission axes of the reflective polarizer 24c and the polarizing plate 3a.

Thus, the phase difference lag of the covering member 22 with respect to the optical axis of the reflective polarizer can be defined as not more than (1/50) π of a measured wavelength.

In the first embodiment, the precise representation of input signals is attainable by controlling the unevenness of luminance to not more than 0.4%. The limit that human beings recognize luminance variations as so-called "unevenness" may be smaller than 0.4% depending on observation circumstances and display conditions. Hence, it is more preferable if the phase difference in the first embodiment is not more than (1/50) π.

1-3. Method of Manufacturing Optical Element Covering Member

Figure 10A:
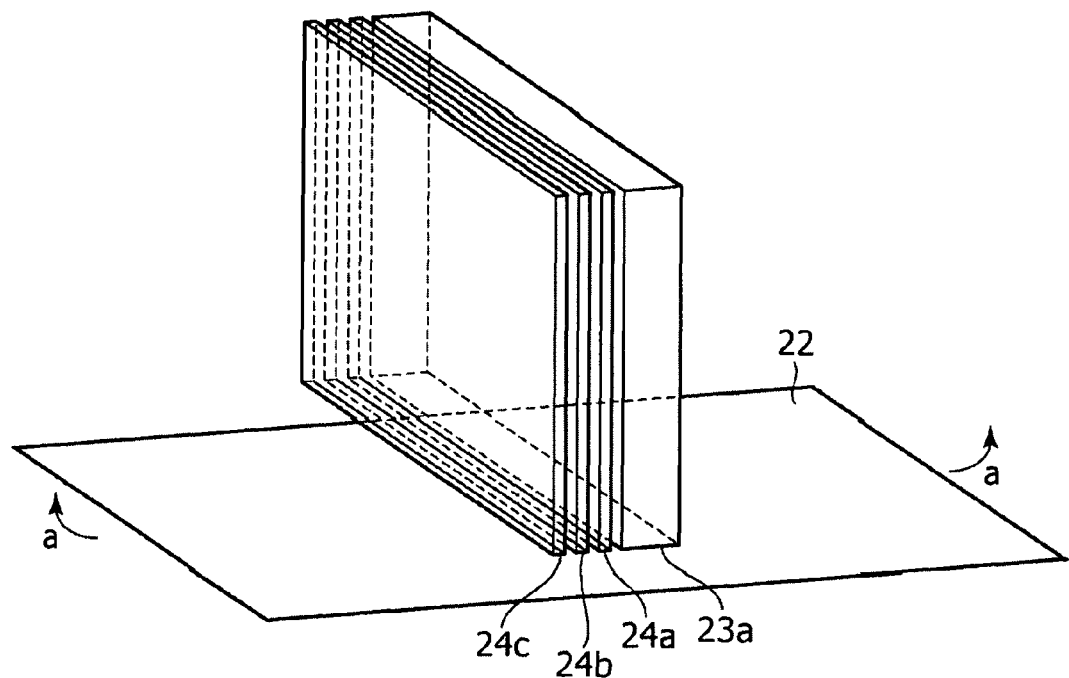
FIGS. 10A and 10B are perspective views for explaining an example of manufacturing method of the optical element covering member in the first embodiment.
Figure 10B:
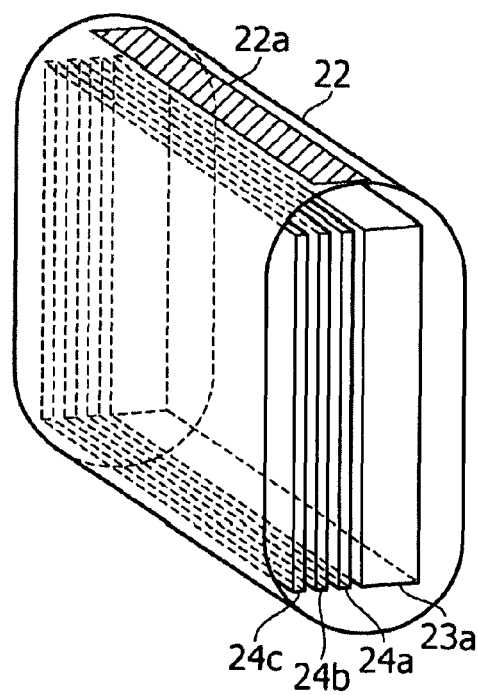

An example of the method of manufacturing the optical element covering member 2 having the configuration will be described below. Firstly, as shown in FIG. 10A, one or a plurality of optical elements 24 and the support medium 23, which are superimposed, are mounted on, for example, the sheet-shaped covering member 22. Subsequently, as shown by the arrow "a" in FIG. 10A, both ends in the longitudinal direction of the sheet-shaped covering member 22 are lifted, and the one or the plurality of the optical elements 24 and the support medium 23 are covered by the covering member 22. Then, as shown in FIG. 10B, for example, the both ends in the longitudinal direction of the covering member 22 are bonded together at the end face of the one or the plurality of the optical elements 24 or the support medium 23. As a bonding method, a bonding method using adhesive, or by welding, or the like may be considered. Examples of the bonding method using adhesive include hot melt type bonding method, thermosetting type bonding method, pressure-sensitive (adhesive) type bonding method, energy ray curing type bonding method, and hydration type bonding method. Examples of the bonding method by welding include heat welding, ultrasonic welding and laser welding. Thereafter, the covering member 22 may be thermally shrunk by applying heat to the covering member 22 where necessary.

As other method of manufacturing the optical element covering member 2, one or more optical elements 24 and the support medium 23 superimposed are inserted into the covering member 22 having a open-ended tubular shaped shape. Thereafter, the covering member 22 may be thermally shrunk by applying heat to the covering member 22 where necessary.

In the first embodiment, the coverage of the optical elements 24 and the support medium 23 by the covering member 22 makes it possible to improve the low rigidity of the optical elements while suppressing the increase in the thickness of the optical elements.

In the first embodiment, the phase difference lag with respect to the optical axis of the reflective polarizer 24c is not more than (1/50) π in the second region of the covering member 22. This enables effective use of the light from the illuminating device 1, thereby preventing a degradation of luminance. It is therefore possible to reduce the unevenness of luminance of the liquid crystal display.

2. Second Embodiment

Figure 11:
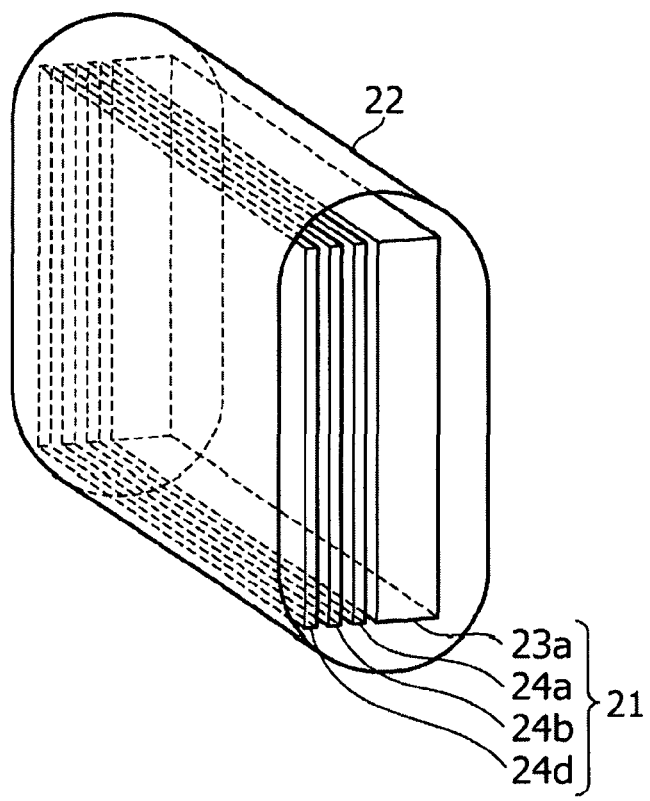
FIG. 11 is a perspective view showing an example of the configuration of an optical element covering member according to a second embodiment.

FIG. 11 shows an example of an optical element covering member according to a second embodiment. In the second embodiment, a prism sheet 24d is provided in place of the reflective polarizer 24c disposed immediately below the second region 22b of the covering member 22 in the first embodiment.

The prism sheet 24d is a type of optical elements having a pattern on a surface of a transparent substrate. A triangle is an optimum shape of the pattern to be formed on the surface. The light emitted from the light source 11 is converged by being reflected and refracted through the prism pattern formed on a film. No limit is imposed on the prism sheet used in the second embodiment. For example, a BEF manufactured by Sumitomo 3M Limited can be used.

The phase difference lag of the covering member 22 with respect to the optical axis of the polarizing plate 3a is not more than (1/14) π of a measured wavelength, because the unevenness of luminance can be reduced. Similarly with the first embodiment, this phase difference lag in this case is the apparent phase difference with respect to the optical axis of the polarizing plate 3a. Alternatively, the first region 22a and the second region 22b of the covering member 22 may have different phase differences. In this case, at least the second region 22b of the covering member 22 may satisfy the relation that the phase difference lag of the polarizing plate 3a with respect to the optical axis is not more than (1/14) π.

No limit is imposed on the material of the covering member 22, as long as the relation of the phase difference lag is satisfied. Materials similar to those of the first embodiment may be used.

For the purpose of suppressing the glare of the prism sheet 24d, it is also preferable to impart slight diffusion characteristic to the second region 22b of the covering member 22.

Figure 12:
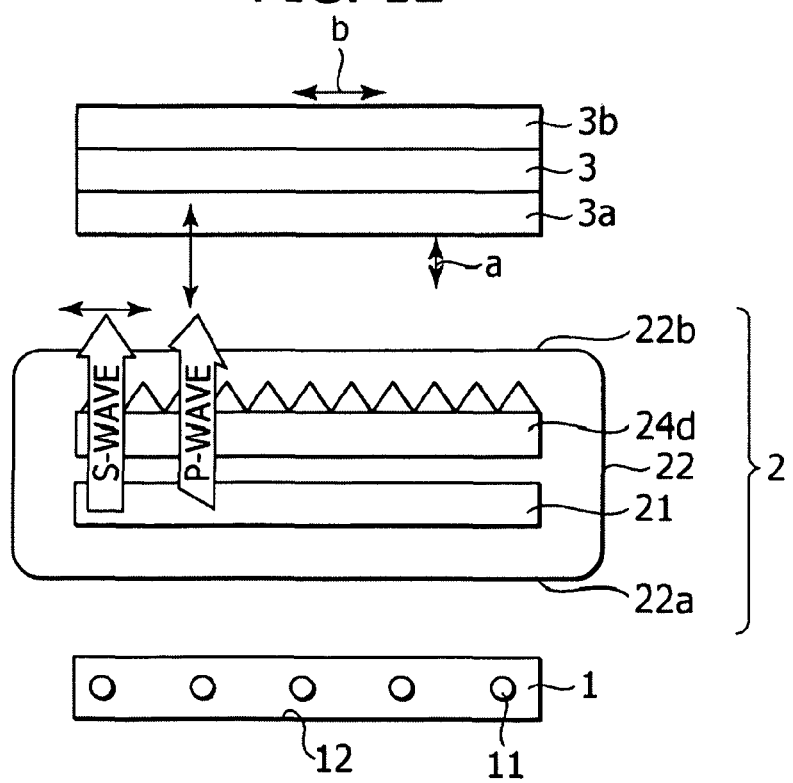
FIG. 12 is a schematic view for explaining the phase difference of a covering member in a liquid crystal display according to the second embodiment.

The reason why the phase difference lag of the covering member 22 with respect to the optical axis of the polarizing plate 3a is set to be not more than (1/14) π of a measured wavelength will be described below with reference to FIG. 12. In FIG. 12, only the prism sheet 24d is shown separately in the optical element stack 21. The ridge line direction of the prism sheet 24d is parallel to the transmission axis of the polarizing plate 3a shown by the arrow "a" in FIG. 7.

First, the role of the prism sheet 24d disposed immediately below the second region 22b of the covering member 22 will be described. The prism sheet 24d raises luminance by converging the light emitted from the light source 11, in the direction of the liquid crystal panel 3.

It is widely known that the effects of reflection and refraction are changed by P-wave and S-wave. An incident surface and the interface plane are orthogonal when P-wave is one in which an electric field vector is parallel to the incident surface, and S-wave is one in which the electric field vector is perpendicular. The reflectance at this time are given by the following equation 1 and equation 2, respectively.

P-Wave:

[Equation 1]

$$R_p = \left(\frac{n_I \cos\theta_{II} - n_{II}\cos\theta_I}{n_I \cos\theta_{II} + n_{II}\cos\theta_I}\right)^2 \quad (1)$$

S-Wave:

[Equation 2]

$$R_s = \left(\frac{n_I \cos\theta_I - n_{II}\cos\theta_{II}}{n_I \cos\theta_I + n_{II}\cos\theta_{II}}\right)^2 \quad (2)$$

Figure 13:
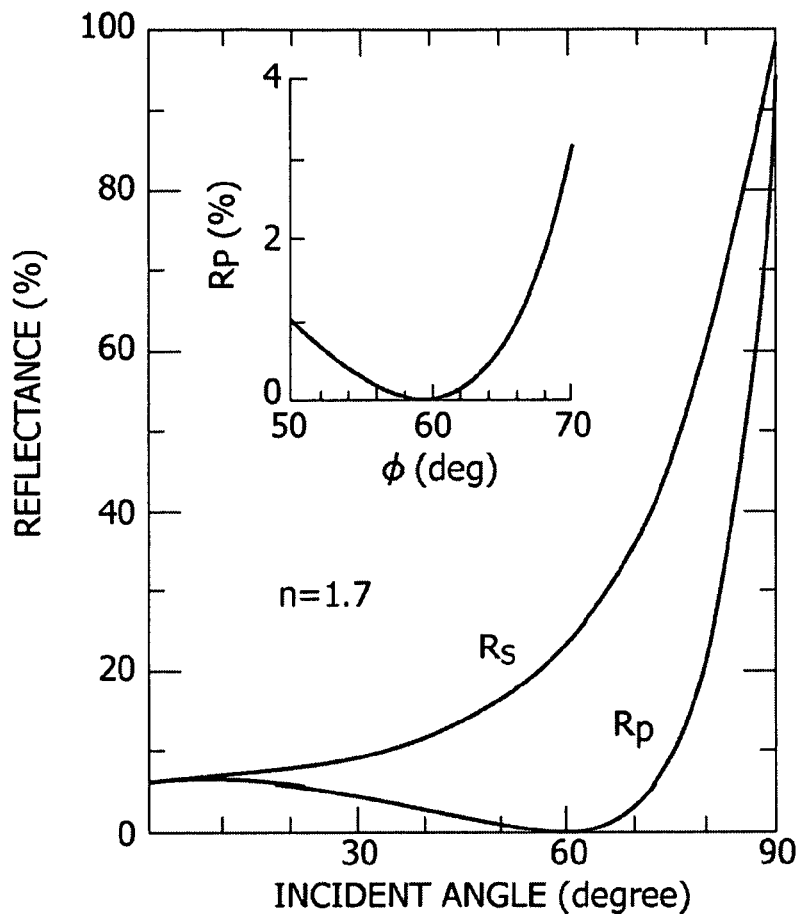
FIG. 13 is a graph showing the reflectance at the interface between a material having a refractive index of 1.7 and the air.

FIG. 13 shows, as an example, the reflectance on the interface between a material having a refractive index, n=1.7, and air. It can be seen from FIG. 13 that the reflectance differs depending on the direction of polarization. The following Table 1 shows the results of experimental comparison of luminance between the case where the transmission axis of the polarizing plate 3a (the arrow a) and the ridge direction of the prism sheet 24d are parallel, and the case where the transmission axis of the polarizing plate 3a (the arrow "a") and the ridge direction of the prism sheet 24d are perpendicular.

The luminance was measured as follows. First, a commercially available liquid crystal television ("32BRAVIA S2000" manufactured by Sony Corporation) was disassembled, and the accompanying diffusion plate and light source provided in the television were used to obtain substantially a Lambert light source. Measurement of luminance was made by arranging a prism sheet ("BEFIII" manufactured by Sumitomo 3M Limited) and a reflective polarizer ("DBEFD" manufactured by Sumitomo 3M Limited), each being provided in the television, on this light source at a desired angle, respectively. Using a luminance meter ("CS-1000" manufactured by Konica Minolta Co., Ltd.), the luminance was measured from front at a viewing angle of 2°.

TABLE 1

| Configuration | Luminance | Ratio |
| --- | --- | --- |
| transmission axis of the polarizing plate and ridge line of prism sheet are parallel | 6150 | 1 |
| transmission axis of the polarizing plate and ridge line of prism sheet are vertical | 6660 | 1.08 |

As shown in Table 1, there is a difference of 8% in luminance between a case where the ridge line direction of the prism sheet 24d and the transmission axis of the polarizing plate are parallel and in the case the direction and the axis are vertical, as shown in table 1. Thus, it can be seen that the reflection and the refraction of the prism sheet 24d have different efficiencies, and the P-wave and the S-wave in the lights emitted from the prism sheet 24d have different proportions and have slight diffusion characteristics. In FIG. 12, the ridge direction of the prism sheet 24d and the transmission axis of the polarizing plate 3a are parallel to each other, and the P-wave passing through the polarizing plate 3a has less components than the S-wave.

If there were a phase difference in the covering member 22 covering the prism sheet 24d in the second embodiment, a change will occur in the proportions of the P-wave and the S-wave, thereby causing variation in a luminance. To achieve the precise representation of the inputs of 256 tones as those in the first embodiment, the luminance variation has to be suppressed to 0.4% or less.

In the second embodiment shown in FIG. 12, for example, when the second region 22b of the covering member 22 has a phase difference of ½ π with respect to the transmission axis of the polarizing plate 3a, namely being a so-called ½ λ plate, the P-wave and the S-wave are exchanged with each other, resulting in an approximately 8% increase in luminance, based on the relationship presented in Table 1. Consequently, the relation of luminance in the second embodiment is given by the following equation:

$$\theta = (\text{Phase difference lag})/(\text{Wavelength}) \times \pi$$

$$R = 1 + \sin^2 \theta \times 0.08$$

where R is a luminance ratio when the phase difference of the covering member 22 and the luminance in FIG. 12 are 1.

Figure 14:
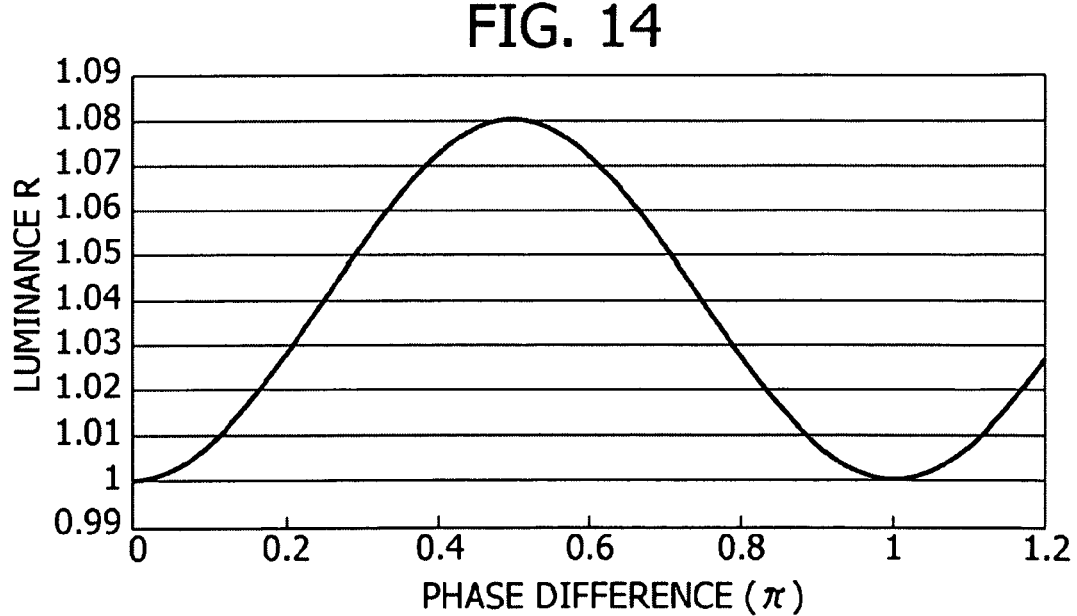
FIG. 14 is a graph showing the relation between the phase difference of the covering member and the luminance ration R in the second embodiment.

FIG. 14 shows a graph, on which the lateral axis represents the phase difference of the covering member 22 and the vertical axis represents a luminance ratio R where it is 1 when the phase difference of the covering member 22 is zero. As shown from FIG. 15, the luminance variation of not more than 0.4% requires luminance ratio R to be in the range from 1 to 1.004, and the phase difference has to be not more than $\frac{1}{14} \pi$. For example, with respect to the light having a measured wavelength of 550 nm, the phase difference lag has to be not more than 39 nm.

Similarly with the first embodiment, the phase difference in the second embodiment indicates the apparent phase difference with respect to the optical axis of the polarizing plate 3a.

Accordingly, it can be seen that, in the second embodiment, the second region 22b of the covering member 22 is required to satisfy the relation expressed by the following equation:

$$Re \times \sin 2\alpha \leq \tfrac{1}{14} \pi$$

where Re is the maximum phase difference of the second region 22b of the covering member 22, and α is an angle formed between the optical axis of the second region 22b and the transmission axis of the polarizing plate 3a.

Thus, the phase difference lag of the covering member 22 with respect to the optical axis of the polarizing plate 3a can be defined as not more than ($\frac{1}{14}$) π of a measured wavelength.

In the second embodiment, the precise representation of input signals is attainable by controlling the unevenness of luminance to not more than 0.4%. The limit that human beings recognize luminance variations as so-called "unevenness" may be smaller than 0.4% depending on observation circumstances and display conditions. Hence, it is more preferable that the phase difference in the first embodiment be not more than ($\frac{1}{14}$) π.

The second embodiment is not limited to the case where the ridge direction of the prism sheet 24d and the transmission axis of the polarizing plate 3a at the light source 11 side of the liquid crystal panel 3 are substantially parallel to each other. For example, the case where the ridge direction of the prism sheet 24d and the transmission axis of the polarizing plate at the light source side of the liquid crystal panel are substantially perpendicular to each other is expressed as follows:

$$R = 1 - \sin^2 \theta \times 0.08$$

where θ is a phase difference lag of the covering member 22 with respect to the optical axis of the polarizing plate 3a. Also in this case, R is in the range of 1 to 0.996 when the phase difference lag is not more than ($\frac{1}{14}$) π.

Preferably, the ridge direction of the prism sheet 24d and the transmission axis of the polarizing plate 3a are substantially perpendicular to each other. In this case, an increase in luminance is attainable.

Thus, the unevenness of luminance can be controlled to 0.4% or less when the phase difference lag is not more than ($\frac{1}{14}$) π, relying on neither the ridge direction of the prism sheet 24d nor the transmission axis of the polarizing plate 3a.

3. Third Embodiment

A third embodiment is different from the second embodiment in that the reflective polarizer 24c is disposed externally of the optical element covering member 2. The reflective polarizer 24c is disposed between the optical element covering member 2 and the liquid crystal panel 3. Alternatively, the optical element 24 disposed externally of the optical element covering member 2 may be bonded with adhesive or the like with an incident surface or an transmission surface of the optical element covering member. Examples of the optical element 24 disposed externally of the optical element covering member 2 include a light diffusion element, a light converging element, a reflective polarizer, a polarizer and a light division element.

Figure 15:
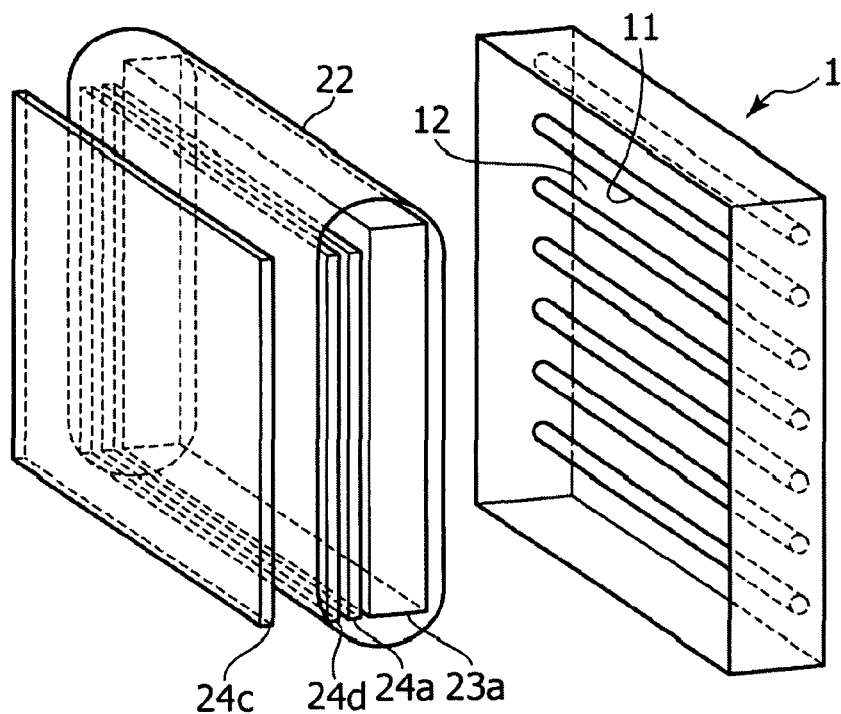
FIG. 15 is a perspective view showing an example of the configuration of a backlight according to a third embodiment.

FIG. 15 shows an example of the configuration of a backlight according to the third embodiment. As shown in FIG. 15, the optical element covering member 2 and the reflective polarizer 24c being an optical element are disposed in this order, from the illuminating device 1 to the liquid crystal panel 3. In the optical element covering member 2, the diffusion plate 23a, the diffuser film 24a and the prism sheet 24d are covered and integrated by the covering member 22.

The phase difference lag of the covering member 22 with respect to the optical axis of the reflective polarizer 24c is not more than $\frac{3}{50}$ π of a measured wavelength, because the unevenness of luminance can be lowered. As similar with the first and second embodiments, this phase difference lag is the apparent phase difference with respect to the optical axis of the polarizing plate 3a. Alternatively, the first region 22a and the second region 22b of the covering member 22 may have different phase differences. In this case, at least the second region of the covering member 22a may satisfy the relation that the phase difference lag with respect to the optical axis of the reflective polarizer 24c is not more than ($\frac{3}{50}$) π.

No limit is imposed on the material of the covering member 22, as long as the relation of the phase difference lag is satisfied. Materials same with those of the first embodiment can be used.

Figure 16:
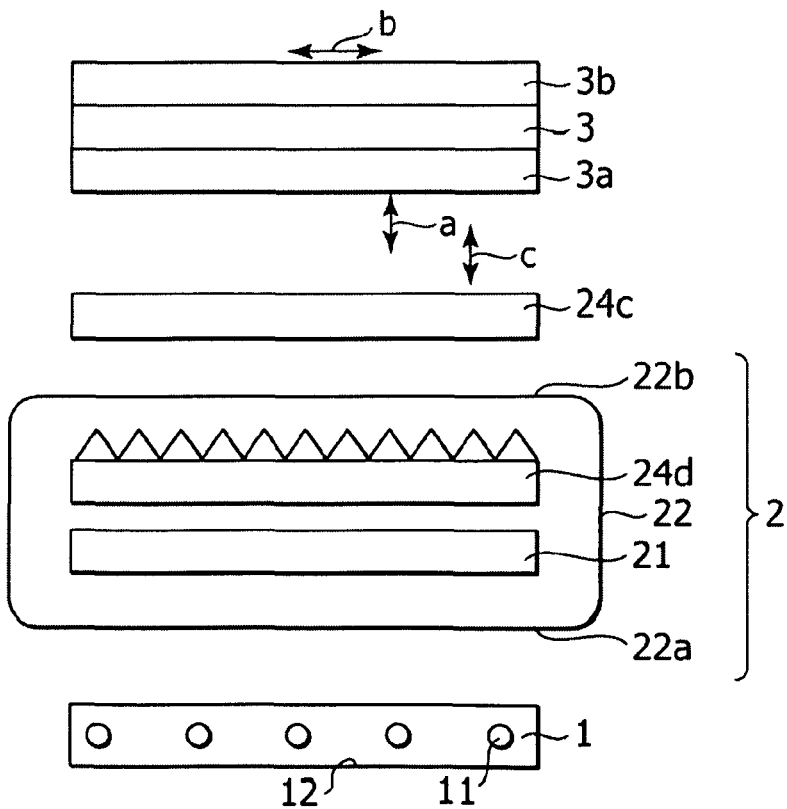
FIG. 16 is a schematic view for explaining the phase difference of a covering member in a liquid crystal display of the third embodiment.

The reason why the phase difference lag of the covering member 22 with respect to the optical axis of the reflective polarizer 24c is set to be not more than ($\frac{3}{50}$) π of a measured wavelength will be described below with reference to FIG. 16. In FIG. 16, only the prism sheet 24d is shown separately in the optical element stack 21.

The following Table 2 shows the results of comparison of luminance between the case of using the covering member 22 having a phase difference of zero, and the case of using the covering member 22 having a phase difference of ¼ λ of a wavelength. Measurement of luminance was made by the same method as the second embodiment.

TABLE 2

| Phase difference of covering member | Luminance | Ratio |
|---|---|---|
| 0 | 5890 | 1 |
| ¼ λ | 6214 | 1.055 |

From Table 2, the following matters can be considered as the reason why the luminance varies by the phase difference of the covering member 22.

(i) The proportions of the P-wave and the S-wave emitted from the prism sheet 24d change;

(ii) The effect of the above (i) is repetitively recycled by the reflective polarizer 24c; and (iii) The lights reflected from the reflective polarizer 24c are reflected by the optical element such as the lens film 24b, and almost all of the lights are reflected when they reenter the reflective polarizer 24c because they cannot pass through unless any change of phase difference occurs.

Figure 17:
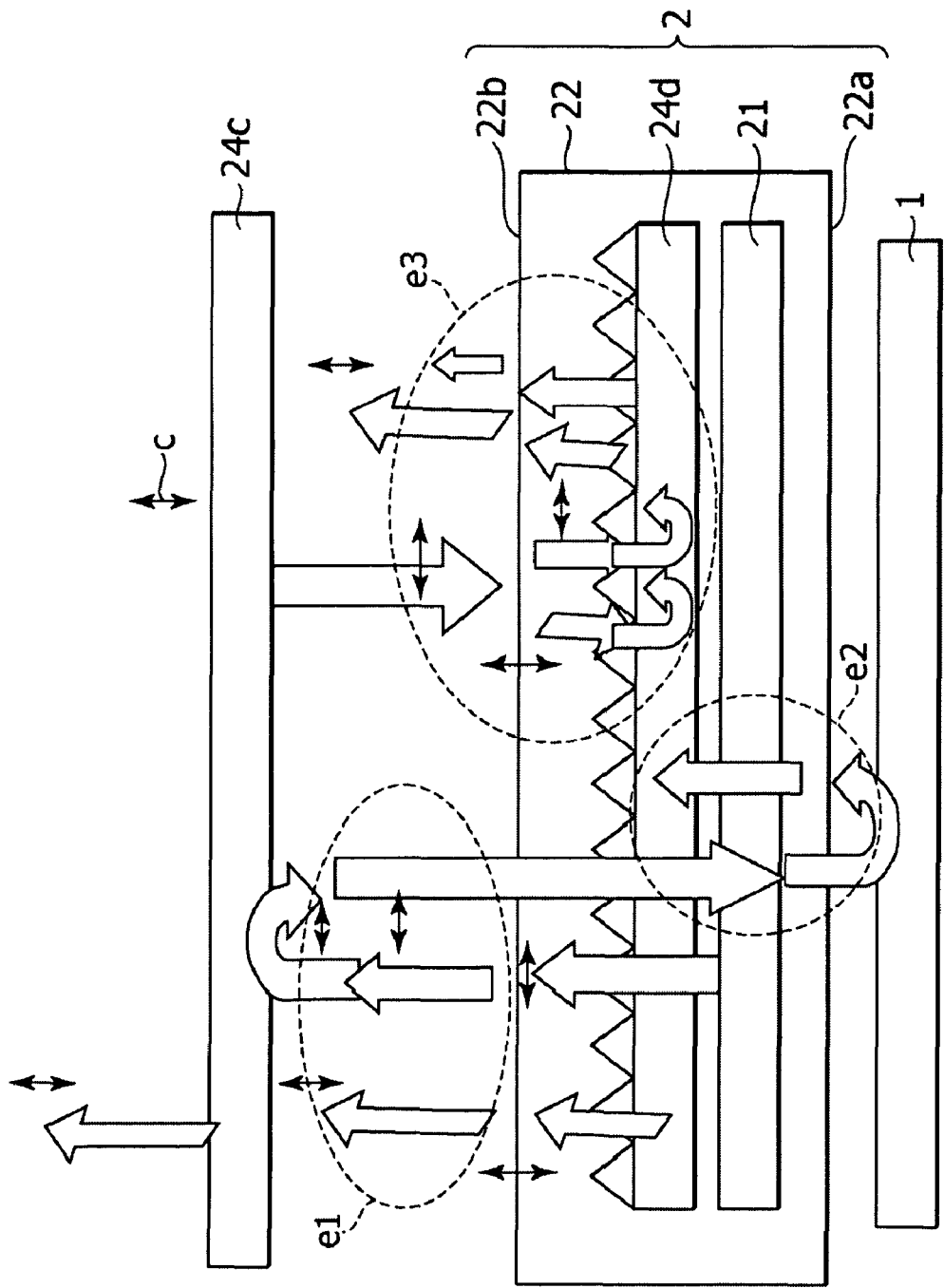
FIG. 17 is a schematic view for explaining the effect of the phase difference of the covering member in the third embodiment.

FIG. 17 shows the foregoing effects together. Specifically, as a first effect, the proportions of the P-wave and the S-wave emitted from the prism sheet 24d will change by their passage through the second region 22b of the covering member 22 as shown by the arrow "e1", thereby increasing the lights passing through the reflective polarizer 24c. As a second effect, the same effect as the first effect can be obtained in the lights reflected and recycled as shown by the arrow "e2". As a third effect, the lights returned from the reflective polarizer 24c are subject to a phase difference during reciprocation within the prism sheet 24d, as shown by the arrow "e3". Provided that the phase difference of the covering member 22 is ¼ λ, it will become ½ λ by the reciprocation. Accordingly, almost all will become the components of the lights passing through the reflective polarizer 24c.

These effects combine to cause a luminance change due to the phase difference of the covering member 22, as shown in Table 2.

Also in the third embodiment, to achieve the precise representation of the inputs of 256 tones as in the case with the first and second embodiments, the luminance variation has to be suppressed to 0.4% or less.

For example, when the second region 22a of the covering member 22 has a phase difference of ¼ π with respect to the transmission axis of the polarizing plate 3a, namely being a so-called ¼ λ plate, the P-wave and the S-wave are exchanged with each other, resulting in an approximately 5.5% increase in luminance, based on the relation presented in Table 2. Consequently, the relation of luminance in the third embodiment is given by the following equation:

$$\theta = (\text{Phase difference lag})/(\text{Wavelength}) \times \pi$$

$$\text{luminance } R = 1 + \sin^2 \theta \times 0.11$$

where R is a luminance ratio when the phase difference of the covering member 22 and the luminance in FIG. 16 are 1.

Figure 18:
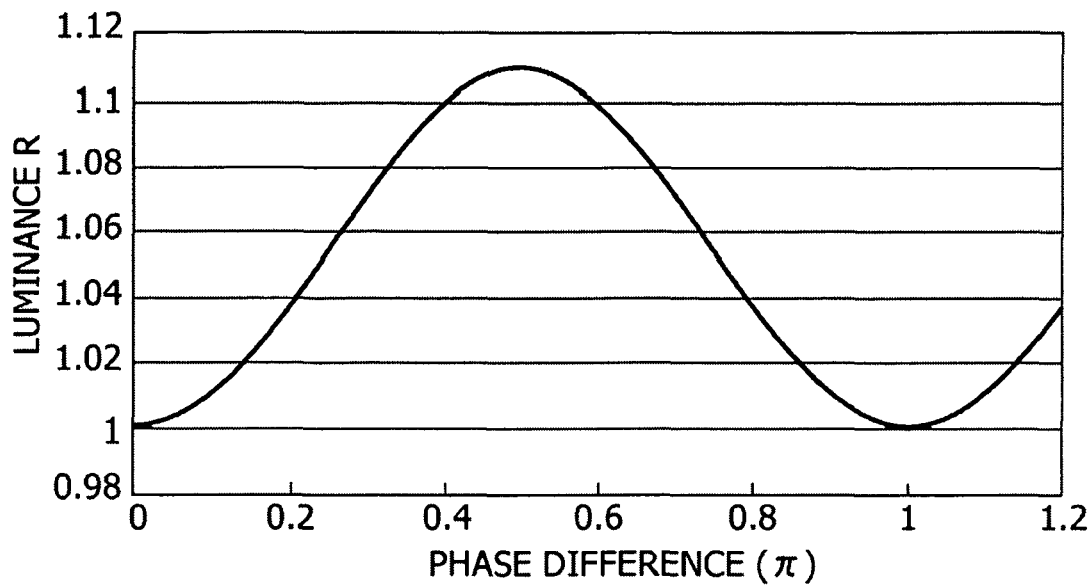
FIG. 18 is a graph showing the relation between the phase difference of the covering member and the luminance ratio R in the third embodiment.

FIG. 18 shows a graph, in which the lateral axis represents the phase difference of the covering member 22 and the vertical axis represents a luminance ratio R where luminance is 1 when the phase difference of the covering member 22 is zero. As can be seen from FIG. 18, a luminance variation of not more than 0.4% can be attained in the range where the luminance ratio R is 1 to 1.004, and the phase difference has to be not more than $\frac{1}{15}\pi$. For example, with respect to the light having a measured wavelength of 550 nm, the phase difference lag has to be not more than 37 nm.

Similarly with the first and second embodiments, the phase difference in the third embodiment indicates the apparent phase difference with respect to the optical axis of the polarizing plate 3a.

Accordingly, in the third embodiment, the second region 22b of the covering member 22 is required to satisfy the relation expressed by the following equation:

$$Re \times \sin 2\alpha \leq \tfrac{3}{50}\pi$$

where Re is the maximum phase difference of the second region 22b of the covering member 22, and α is an angle formed between the optical axis of the second region 22b and the transmission axis of the polarizing plate 3a.

Thus, the phase difference lag of the covering member 22 with respect to the optical axis of the polarizing plate 3a can be defined as not more than (3/50) π of a measured wavelength.

In the third embodiment, the precise representation of input signals is attainable by controlling the unevenness of luminance to not more than 0.4%. The limit that human beings recognize luminance variations as so-called "unevenness" may be smaller than 0.4% depending on observation circumstances and display conditions. Hence, it is more preferable if the phase difference in the first embodiment be not more than (3/50) π.

In the third embodiment, the optical elements 24 such as the reflective polarizer 24c are disposed externally of the optical element covering member 2. Hence, the lights emitted from the optical elements 24 such as the reflective polarizer 24c can be entered into the liquid crystal panel 3, without changing the retardation of these lights.

The third embodiment is not limited to the case where the ridge direction of the prism sheet 24d and the transmission axis of the reflective polarizer 24c are substantially parallel to each other. For example, the case where the ridge direction of the prism sheet 24d and the transmission axis of the reflective polarizer 24c are substantially perpendicular to each other can be expressed as follows:

$$R = 1 - \sin^2 \theta \times 0.11$$

where θ is a phase difference lag of the covering member 22 with respect to the transmission axis of the reflective polarizer 24c. Also in this case, R is in the range of 1 to 0.996 when the phase difference lag is not more than (3/50) π.

Preferably, the ridge direction of the prism sheet 24d and the transmission axis of the polarizing plate 3a are substantially perpendicular to each other. In this case, an increase in luminance is attainable.

Thus, the unevenness of luminance can be suppressed to not more than 0.4% when the phase difference lag is not more than (3/50) π, relying on neither the ridge direction of the prism sheet 24d nor the transmission axis of the polarizing plate 3c.

4. Fourth Embodiment

A fourth embodiment is different from the first to third embodiments in that a structure and an optically functional layer are disposed on at least one of the inner surface and the outer surface of the covering member 22. For example, this optically functional layer is disposed on at least one of the incident surface and the transmission surface of the optical element covering member 2. The structure and the optically functional layer are for improving the characteristics of the light inputted from the illuminating device 1. Examples of the structure include various types of lens such as a cylindrical lens, a prism lens and a flyeye lens. Alternatively, a wobble may be added to the structure such as the cylindrical lens or the prism lens. This structure can be formed by, for example, melt-extrusion method or thermal transfer method. Examples of the optically functional layer include a UV-cut functional layer and an IR-cut functional layer.

Figure 19:
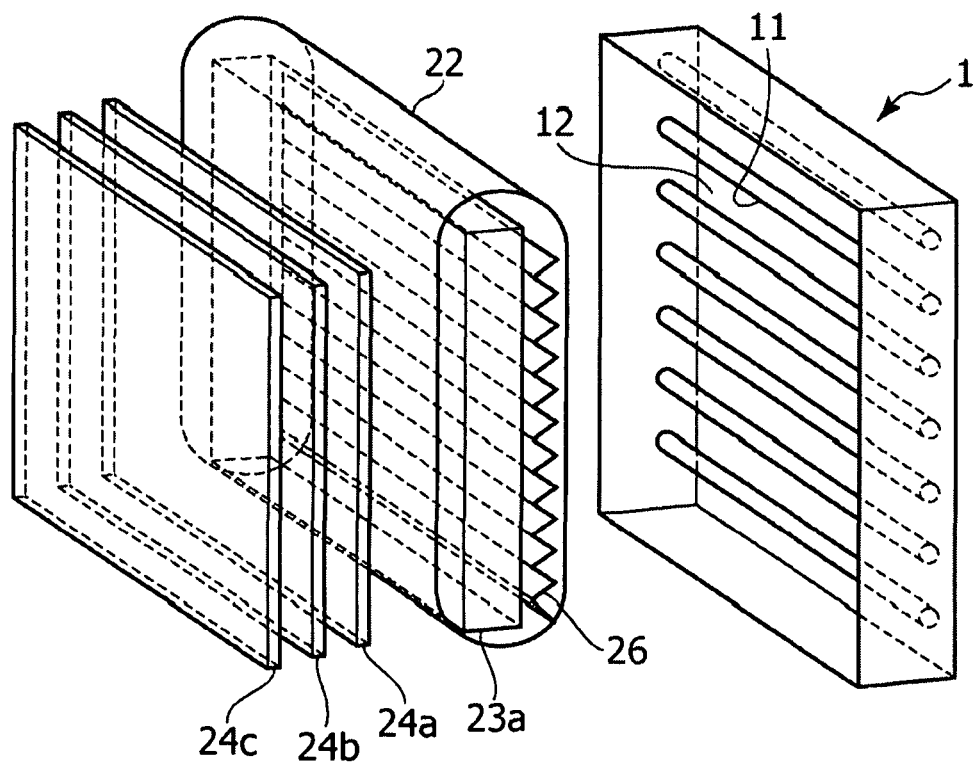
FIG. 19 is a perspective view showing an example of the configuration of a backlight according to a fourth embodiment.
Figure 20:
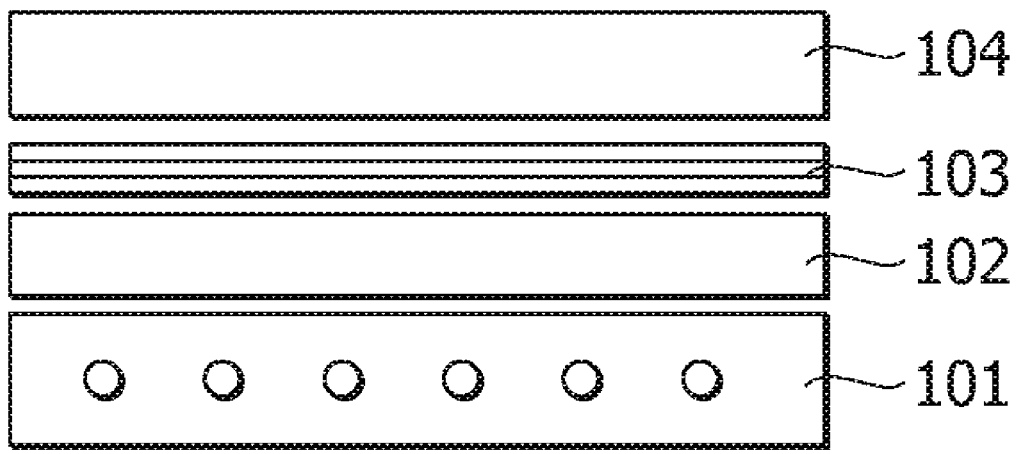
FIG. 20 is a schematic view showing the configuration of a known liquid crystal display.

FIG. 19 shows an example of the configuration of a backlight according to the fourth embodiment. As shown in FIG. 18, the diffusion plate 23a, the diffuser film 24a, the lens film 24b and the reflective polarizer 24c are disposed in this order, from the illuminating device 1 to the liquid crystal panel 3. The diffusion plate 23a is covered by the covering member 22, and a structure 26 having unevenness elimination function is disposed at the input side portion of the inner surface of the covering member 22.

In the fourth embodiment, the structure and the optically functional layer are disposed on at least one of the inner surface and the outer surface of the covering member 22. This permits a reduction in the number of optical elements to be covered by the covering member 22, further thinning the optical element covering member 2 and the liquid crystal display.

While the embodiments of the present application have been described specifically, it is to be understood that the present application is not limited to the embodiments, and various modifications may be made.

For example, the numeral values in the embodiments are cited merely by way of example, and different numeral values may be used as needed. Further, the respective configurations of the embodiments can be combined together in an embodiment.

A partial bonding between the optical elements or between the optical element and the support medium may be made so as not to impair any optical function, and the bonding is preferably made at the end portion, in order to suppress deterioration of display function.

The optical element covering member may further include a brightness-irregularity-reducing film. For example, the unevenness elimination film is disposed between the incident surface of the support medium and the covering member.

Instead of the film-shaped or sheet-shaped covering member, a case having a certain degree of rigidity may be used as the covering member.

Thus, the lack of rigidity of the optical elements can be improved while suppressing the increase in the thickness of the liquid crystal display, or the deterioration of the display characteristics of the liquid crystal display. The luminance variations due to the covering member can also be suppressed, thereby suppressing the deterioration of optical characteristics.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. An optical element covering member comprising:
   one or more optical elements;
   a support medium for supporting the one or more optical elements; and
   a covering member for covering the one or more optical elements and the support medium, the entire covering member consisting of a single flexible film-shaped or sheet-shaped article, wherein;
   at least one out of the one or more optical elements is a prism sheet, and the covering member has at least a region, through which a light inputted from a light source is emitted to a liquid crystal panel, the region having a phase difference lag of not more than $1/14\,\pi$ of a measured wavelength of light emitted from the light source, with respect to an optical axis of a polarizing plate provided at the light source side of the liquid crystal panel.

2. The optical element covering member according to claim 1, wherein the prism sheet is disposed within the region of the covering member.

3. The optical element covering member according to claim 1, wherein input signals are expressed in 256 tones in the liquid crystal panel.

4. The optical element covering member according to claim 1, wherein a ridge direction of the prism sheet and a transmission axis of the polarizing plate at the light source side of the liquid crystal panel are substantially perpendicular to each other.

5. The optical element covering member according to claim 1, wherein a structure is disposed on at least one of an inner surface and an outer surface of the covering member.

6. The optical element covering member according to claim 1, wherein a partial bonding between the optical elements or between the optical element and the support medium is made at an end portion.

7. The optical element covering member according to claim 1, wherein a coefficient of thermal expansion of the covering member is smaller than that of the support medium and that of the optical element.

8. A backlight comprising:
   a light source for emitting light; and
   an optical element covering member for improving characteristics of the light emitted from the light source and emitting the resultant light to a liquid crystal panel,
   the optical element covering member includes:
   one or more optical elements;
   a support medium for supporting one or more optical elements; and
   a covering member for covering the one or more optical elements and the support medium, the entire covering member consisting of a single flexible film-shaped or sheet-shaped article, wherein;
   at least one out of the one or more optical elements is a prism sheet, and the covering member has at least a region, through which the light inputted from the light source is emitted to the liquid crystal panel, the region having a phase difference lag of not more than $1/14\,\pi$ of a measured wavelength of light emitted from the light source, with respect to an optical axis of a polarizing plate provided at the light source side of the liquid crystal panel.

9. The backlight according to claim 8, wherein;
   one or more optical elements are provided between the optical element covering member and the liquid crystal panel;
   at least one out of the one or more optical elements disposed between the optical element covering member and the liquid crystal panel is a reflective polarizer; and
   when a transmission axis of the reflective polarizer and a transmission axis of the polarizing plate provided at the light source side of the liquid crystal panel are substantially parallel, the region, through which the light is inputted from the light source of the covering member is emitted to the reflective polarizer, has a phase difference lag of not more than $3/50\,\pi$ of a measured wavelength, with respect to an optical axis of the reflective polarizer.

10. The optical element covering member according to claim 8, wherein the prism sheet is disposed within the region of the covering member.

11. The optical element covering member according to claim 8, wherein input signals are expressed in 256 tones in the liquid crystal panel.

12. The optical element covering member according to claim 8, wherein a ridge direction of the prism sheet and a transmission axis of the polarizing plate at the light source side of the liquid crystal panel are substantially perpendicular to each other.

13. The optical element covering member according to claim 8, wherein a structure is disposed on at least one of an inner surface and an outer surface of the covering member.

14. The optical element covering member according to claim 8, wherein a partial bonding between the optical elements or between the optical element and the support medium is made at an end portion.

15. The optical element covering member according to claim 8, wherein a coefficient of thermal expansion of the covering member is smaller than that of the support medium and that of the optical element.

16. A liquid crystal display comprising:

a light source for emitting light;

an optical element covering member for improving characteristics of the light emitted from the light source; and a liquid crystal panel for displaying an image based on the light whose characteristics are improved by the optical element covering member, wherein;

the optical element covering member includes;

one or more optical elements;

a support medium for supporting the one or more optical elements; and a covering member for covering the one or more optical elements and the support medium, the entire covering member consisting of a single flexible film-shaped or sheet-shaped article, wherein;

at least one out of the one or more optical elements is a prism sheet, and the covering member has at least a region, through which the light inputted from the light source is emitted to the liquid crystal panel, the region having a phase difference lag of not more than $1/14\ \pi$ of a measured wavelength of light emitted from the light source, with respect to an optical axis of a polarizing plate provided at the light source side of the liquid crystal panel.

17. The liquid crystal display according to claim 16, wherein;

one or more optical elements are disposed between the optical element covering member and the liquid crystal panel;

at least one out of the one or more optical elements disposed between the optical element covering member and the liquid crystal panel is a reflective polarizer; and when a transmission axis of the reflective polarizer and a transmission axis of the polarizing plate provided at the light source side of the liquid crystal panel are substantially parallel, the region, through which the light inputted from the light source of the covering member is emitted to the reflective polarizer, has a phase difference lag of not more than $3/50\ \pi$ of a measured wavelength, with respect to an optical axis of the reflective polarizer.

18. The optical element covering member according to claim 16, wherein the prism sheet is disposed within the region of the covering member.

19. The optical element covering member according to claim 16, wherein input signals are expressed in 256 tones in the liquid crystal panel.

20. The optical element covering member according to claim 16, wherein a ridge direction of the prism sheet and a transmission axis of the polarizing plate at the light source side of the liquid crystal panel are substantially perpendicular to each other.

21. The optical element covering member according to claim 16, wherein a structure is disposed on at least one of an inner surface and an outer surface of the covering member.

22. The optical element covering member according to claim 16, wherein a partial bonding between the optical elements or between the optical element and the support medium is made at an end portion.

23. The optical element covering member according to claim 16, wherein a coefficient of thermal expansion of the covering member is smaller than that of the support medium and that of the optical element.

* * * * *